Aug. 4, 1964     C. C. CRAVEN     3,143,341
CENTERING CLAMP ATTACHMENT
Filed Oct. 17, 1960

INVENTOR.
CLAUD C. CRAVEN
BY K. M. Thorpe
Atty.

3,143,341
CENTERING CLAMP ATTACHMENT
Claud C. Craven, 1802 Pendleton, Kansas City 24, Mo.
Filed Oct. 17, 1960, Ser. No. 63,086
2 Claims. (Cl. 269—240)

This invention relates to a holding or clamping attachment for use in combination with the chuck of a dividing head or the like, on a machine tool or on a milling machine table to hold circular or round work or shafts which are to be slotted at various angles or at points remote from their ends.

Another object of the invention is to produce an attachment which can be used for the chucking of round shafts without the necessity of centering the end of the shaft.

A further object of the invention is to produce a V-type clamp in which the center of the V-jaw falls in the plane coinciding with the horizontal center line of the dividing head chuck.

A still further object of the invention is to provide a clamp or work holder of such character that the work piece and dividing head may be moved in relation to the clamp, or the clamp and work piece can be moved in relation to the dividing head without losing the set up or original index location.

Another object of the invention is to produce a V-type clamp which will center shafts of varying diameter without any vertical adjustment of the clamp With the general objects named in view and others as will hereinafter appear, the invention consists in certain new and useful features of construction and combination of parts as hereinafter described and claimed; and in order that it may be fully understood, reference is to be had to the accompanying drawing, in which:

Figure 1:
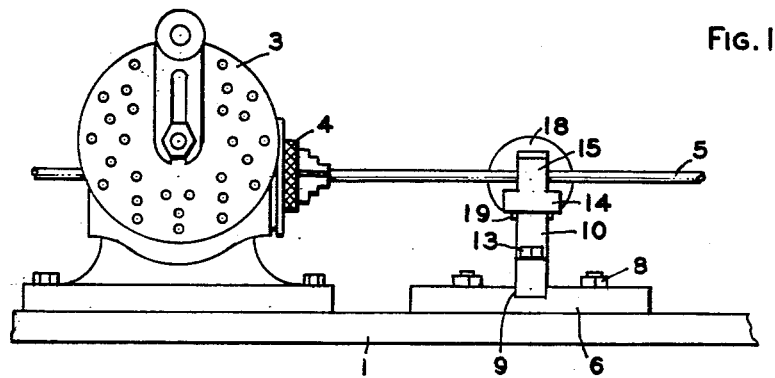
FIGURE 1 is a front elevation of a milling machine table with a dividing head and attachment embodying the invention mounted on the table.

In the said drawing, where like reference characters identify corresponding parts in all of the figures, 1 illustrates a machine tool table having longitudinally extending ways 2. Mounted in the ways is a dividing head 3 having a chuck 4 carrying a rod or shaft 5 to be slotted at various angular locations in reference to an indexing location.

Under usual practice the end of the shaft must be formed with a center, and if the slotting operation requires relocation of the shafting in relation to the dividing head, the initial reference or indexing point is lost as soon as the dividing head chuck is loosened. With the clamping attachment of the invention, however, the work is always clamped against rotation and loss of reference point by either the clamp of the attachment or the chuck of the dividing head, and as long as one or the other is kept tight on the work, the work and clamp may be removed and replaced in the machine tool table ways without loss of index or reference point.

The attachment of the invention comprises a V-clamp having the horizontal plane of the bottom of its V-jaw in the horizontal plane of the center of the dividing head chuck so that any diameter shaft will be held centered in relation to the chuck center, and may be constructed as follows: 6 is a base plate having its underside formed for cooperative guided clamped relation to the machine tool ways as by having a guide spline 7 projecting from the underside of the plate 6 to enter a way groove 2 and adapted to be clamped in position by a bolt 8.

The upper face of the plate 6 is slotted at right angles as at 9, and fitted in said slot is the base of a vertically projecting standard 10 having a horizontal opening V-jaw 11. The parts are so designed that the bottom of the V-jaw falls in the horizontal plane of the chuck 4 of the dividing head 3.

The lower end of the standard 10 is slotted as at 12 so that it can be clamped in adjusted position by bolts 13 engaging the base plate 6. With this construction it will be apparent that the V-jaw 11 will accommodate various diameters of shafts as it can be moved horizontally to and from the center line of the work without a change in elevation.

In order to clamp a shaft 5 in the attachment the standard 10 is embraced by a yoke frame 14 formed with a V-jaw 15 at one end, and having a threaded abutment 16 at its other end. Threaded through the abutment is a shaft 17 with a handle 18, said shaft abutting standard 10 so that its jaw 15 may be drawn into cooperation with the V-jaw 11 of said standard for cooperative clamping of a shaft 5.

Figure 2:
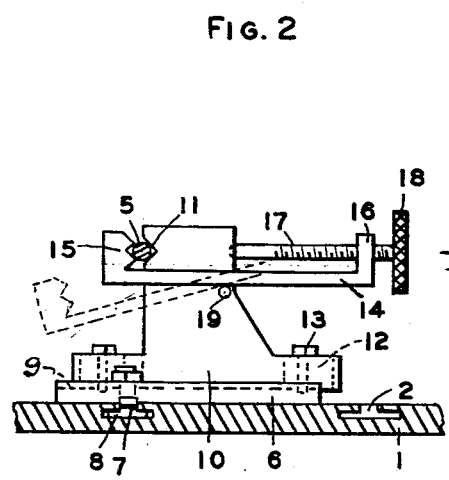
FIGURE 2 is a transverse section through the milling machine table to illustrate an end view of the attachment mounted thereon.
Figure 3:
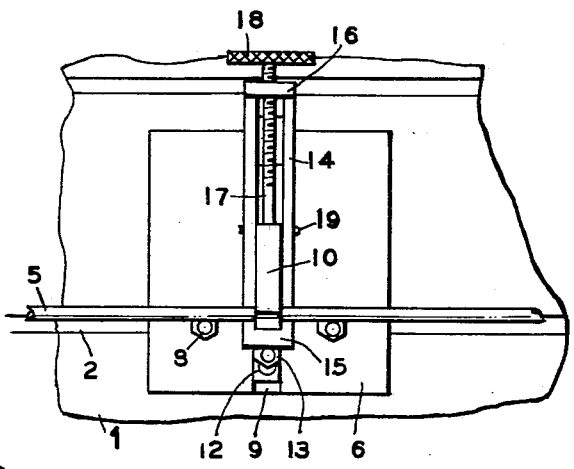
FIGURE 3 is a top plan view of the attachment as shown in FIGURE 2.

In order to make the clamp jaws readily adjustable to manipulate with one hand to accommodate the work, a shoulder 19 is formed by a pin projecting from the standard underlying the lower surface of the yoke 14. By rotating the shaft 17 a turn or two in the clamp-loosening direction, the yoke may be rocked downwardly to the dotted line position shown in FIGURE 2, whereby work of various diameters may be released and removed and new work inserted for clamping in the desired position without having to open the jaws horizontally a distance greater than the diameter of the work as would otherwise be necessary.

From the above description and drawing, it will be apparent that I have produced a construction embodying all of the features and advantages set forth as desirable, and while I have described and illustrated the preferred embodiment, it is to be understood that I reserve the right to make all changes within the scope of the appended claims.

I claim:

1. A work piece supporting device comprising, a base plate, a standard projecting upwardly from said base plate and having opposed vertical side surfaces and opposed vertical end surfaces, said standard having a V-jaw on one of said end surfaces, a rectangular frame having an abutment at one end thereof and upwardly extending means having an interior facing V-jaw at the other end thereof, said frame surrounding said standard and positioned thereon whereby said frame V-jaw is selectively opposed to said standard V-jaw, a threaded bore in said abutment and a threaded shaft engaged in said bore and adapted to bear against the other of said end surfaces for drawing said frame V-jaw toward said standard V-jaw, and means projecting laterally from said side surfaces and selectively slidably and pivotally supporting said frame on said standard permitting said frame other end to selectively pivot downwardly away from said standard V-jaw.

2. The combination of claim 1 wherein said means projecting from said side surfaces are pins.

References Cited in the file of this patent

UNITED STATES PATENTS

| | | |
|---|---|---|
| 807,945 | Lang | Dec. 19, 1905 |
| 1,318,688 | Paschall | Oct. 14, 1919 |
| 2,345,708 | Lines | Apr. 4, 1944 |